United States Patent [19]
Strasburger

[11] Patent Number: 6,072,389
[45] Date of Patent: Jun. 6, 2000

[54] BRAKE ADJUSTMENT MONITOR DEVICE FOR AUTOMOTIVE VEHICLES

[76] Inventor: Bill Strasburger, P.O. Box 2104, Yorba Linda, Calif. 92885-1304

[21] Appl. No.: 09/400,664

[22] Filed: Sep. 20, 1999

[51] Int. Cl.⁷ .................................................... B60Q 1/00
[52] U.S. Cl. .................... 340/454; 340/453; 188/1.11; 92/512; 116/208
[58] Field of Search ................................. 340/454, 453; 188/1.11; 92/512; 116/208

[56] References Cited

U.S. PATENT DOCUMENTS

| | | | |
|---|---|---|---|
| 4,945,818 | 8/1990 | Ware | 92/5 R |
| 5,140,932 | 8/1992 | Goldfein et al. | 116/208 |
| 5,285,190 | 2/1994 | Humphreys et al. | 340/453 |
| 5,320,198 | 6/1994 | Hoyt et al. | 188/1.11 |
| 5,358,075 | 10/1994 | Jarzombek | 188/1.11 |
| 5,433,296 | 7/1995 | Webberley | 188/1.11 |
| 5,450,930 | 9/1995 | Martens et al. | 188/1.11 |
| 5,474,154 | 12/1995 | Coale | 188/1.11 |
| 5,649,469 | 7/1997 | Pierce | 92/5 R |
| 5,934,415 | 8/1999 | Preston et al. | 188/1.11 |

*Primary Examiner*—Daniel J. Wu
*Assistant Examiner*—Tai T. Nguyen
*Attorney, Agent, or Firm*—Dennis W. Beech

[57] ABSTRACT

The brake adjustment monitor has a pull or breakaway switch having an activation pin as part thereof which activation pin is attached to the push rod and slack adjustment arm assembly of an air brake system by a cable. The switch itself is attached to an existing bolt screw or like attachment device on the air chamber assembly of the brake. When the switch and cable are installed on a brake assembly the cable is adjusted to a length to pull the activation pin to operate the switch when the push rod has traveled a predetermined distance. This distance, as is known in the art, is an indication of brake wear or misadjustment. A number of bulb indicators with or without sound indicators may be mounted on a trailer or motorized vehicle and electrical connected to indicate to an operator the switch activation.

7 Claims, 3 Drawing Sheets

BRAKE ADJUSTMENT MONITOR DEVICE FOR AUTOMOTIVE VEHICLES

BACKGROUND OF THE INVENTION

1. Field of the Invention

This invention relates to devices used to monitor the brake wear and adjustment on vehicles employing air brake systems, such as, trucks, tractor trailers, buses and the like. The new device provides a simple means to install a monitoring system for monitoring each of the brakes of a vehicle.

2. Description of Related Art

There are currently published and known systems in the art which typically use a permanent magnet as a basis for measuring brake wear wherein the magnet is mounted to a rod which moves when the air brakes are activated. For example, the push rod of a brake system travels a certain distance when air pressure is applied to an air chamber assembly which distance is a function of brake wear and adjustment of the brake assembly. A magnetically activated switch is used in cooperation with the magnet such that if the push rod moves a certain distance the switch is activated to signal that the brake must be attended to for repair. Examples of such systems are disclosed in U.S. Pat. No. 4,757,300 and 4,855,712.

Other attempts to use measured motion of the push rod, other brake rods and rotation of the connection between the push rod and shock adjuster arm have also been proposed. In U.S. Pat. No. 5,689,231, a transducer engaged with a clevis pin monitors rotation relative to the push rod and shock adjuster arm to provide indication when brake repair may be necessary.

The present invention provides a simple mechanism for monitoring brake wear and adjustment by using a cable attached to a pull or breakaway switch to signal when the air brake system push rod has traveled beyond a predetermined distance relative to the air chamber. This device is relatively easy to install on existing brakes using for attachment points existing threaded bolts, screws and the like. The pull or breakaway switch may be a rugged self contained unit with two electrical leads and have a simple cable attachment. No devices need to be mounted to the push rod obviating the concern for proper location of such units.

SUMMARY OF THE INVENTION

One object of the present invention is simple, straight forward attachment of the brake monitor device to existing or new air brake systems to signal the event of an air brake rod movement beyond a predetermined distance. Another object is to allow such brake monitoring device to operate using an existing vehicle power source or using a power source independent of the vehicle. A further object is to provide indication of monitoring device activation on separate trailers as well as on motorized vehicles.

In accordance with the description presented herein, other objectives of this invention will become apparent when the description and drawings are reviewed.

DESCRIPTION OF THE PREFERRED EMBODIMENT

The brake adjustment monitor device comprises a pull or breakaway switch attached to the vehicle air brake chamber structure and having a cable attached to the rods or slack adjustment arm of a vehicle air brake system. The cable length when installed is adjusted to activate the switch when the air brake rod has traveled a predetermined distance. The predetermined distance is an indication that in air brake systems the brake pads and drum (25) have reached a condition in which the brakes will soon no longer engage or function. The switch is electrically connected to one or more bulb indicators and if desired a sound signaling device.

Figure 1:
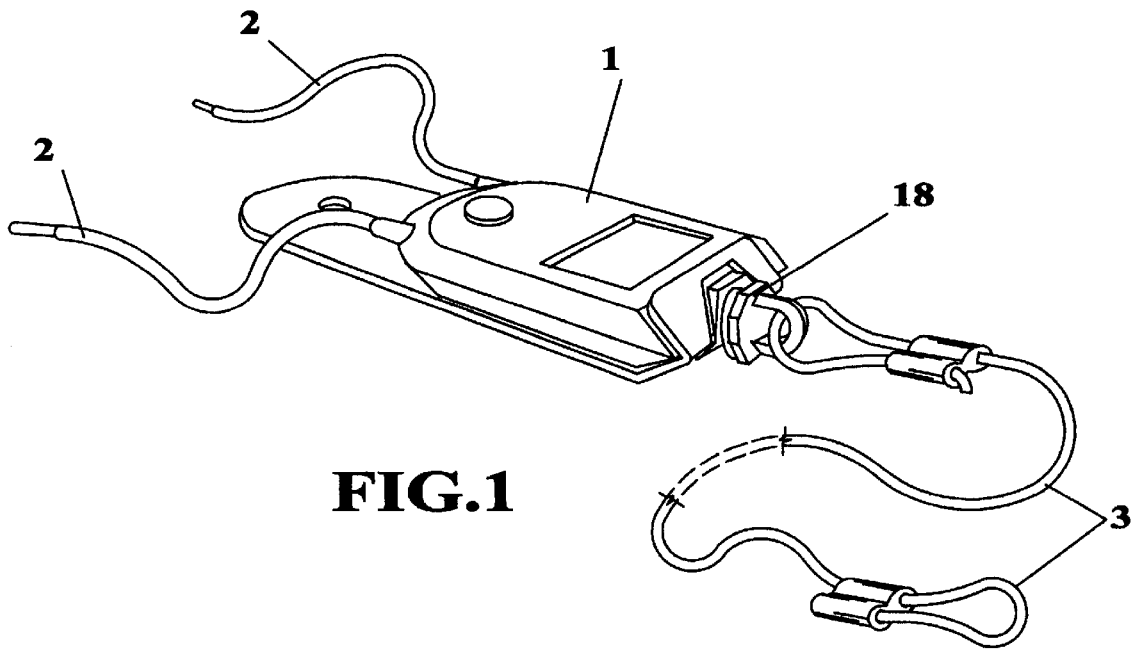
FIG. 1 illustrates a perspective view of a pull or breakaway switch.
Figure 2:
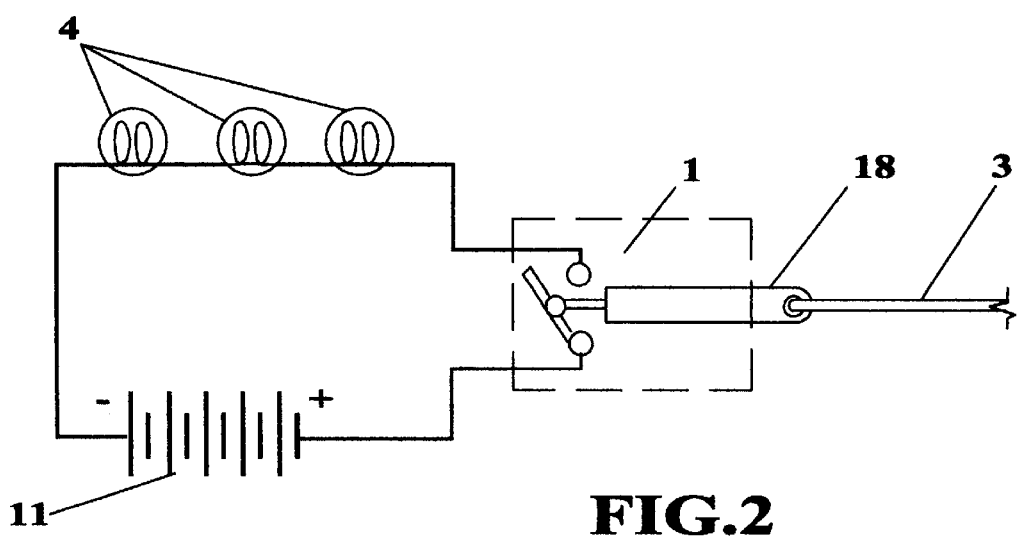
FIG. 2 illustrates a schematic view of the switch attached to a bulb warning system using an independent power source.
Figure 3:
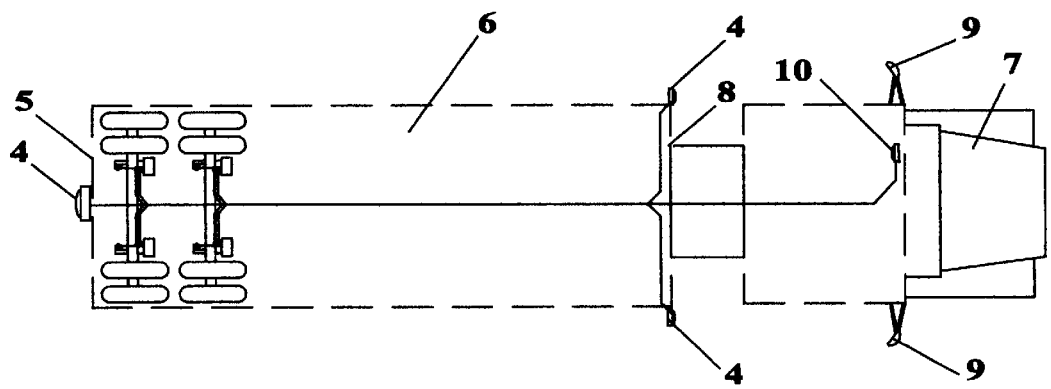
FIG. 3 illustrates a schematic representation of the monitoring device having a plurality of bulb warning indication locations.
Figure 4:
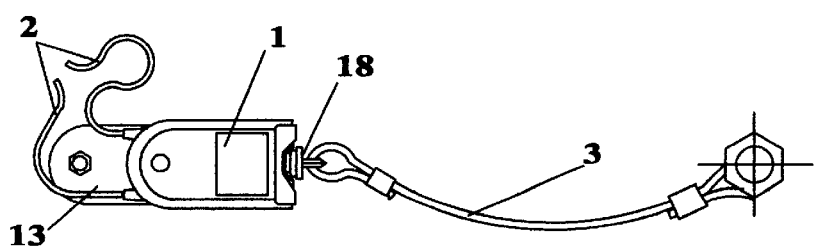
FIG. 4 illustrates a pull type switch and cable in the monitor position.

Referring to FIGS. 1 through 3, the monitoring device has a switch (1) with electrical leads (2) and cable (3). The electrical leads (2) are in communication with one or more bulbs (4) for indicating the switch (1) open or closed status. The bulb (4) warning indicators may be on the rear (5) of a trailer (6) or motorized vehicle (7), on the front (8) so as to be viewed in the drivers rear view mirrors (9) and/or mounted with the vehicle dash board indicators (10). Obviously these bulbs (4) may be augmented with a warning sound device such as a buzzer (not shown).

For any vehicle, but in particular for a trailer as illustrated in FIG. 3, the monitoring device may use a power supply (11) independent of the vehicle standard electrical power system such as brake light system or ignition switch power system. This provides added safety margin as the monitoring device does not depend on proper vehicle electrical connection to provide warning of brake wear. Of course the monitoring device may be connected to the vehicle electrical power system as is commonly understood. By placing bulb (4) warning indicators on the front (8) of a trailer, an operator may be warned of brake wear even if the vehicle to trailer electrical system has not been properly connected.

Referring to FIGS. 4 through 9, the switch (1) and cable (3) are illustrated in both monitoring and activated conditions and are shown attached to vehicle brake assemblies (12). In the preferred embodiment the switch (1) has bracket (13) with aperture (14). An angle bracket (15) is attached to an existing threaded bolt (16) on the air brake air chamber assembly (17). The bracket (13) is then attached, either fixedly or rotatably, to the angle bracket (15).

The cable (3) on one end is attached to an activation pin (18) of the switch (1) and on the opposite end to an existing bolt, screw, pin or the like of the slack adjuster arm (19) of the brake assembly (12). When the cable (3) is installed, its length is adjusted to cause it to pull the activation pin (18) should the brake push rod (20) travel more than a predetermined distance when the vehicle operator depresses the brake peddle. This distance of travel is based on brake type to indicate wear on the brake has reached a predetermined point such that brake failure is imminent.

Figure 5:
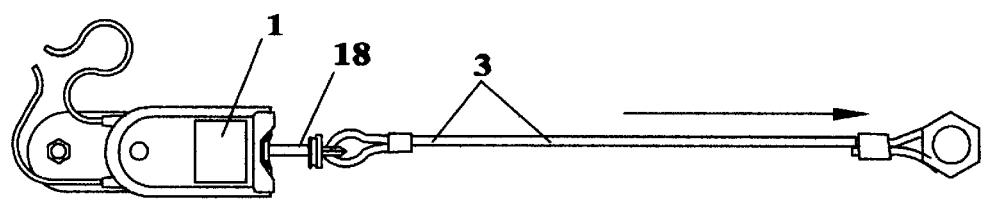
FIG. 5 illustrates a pull type switch and cable in the activated position.
Figure 6:
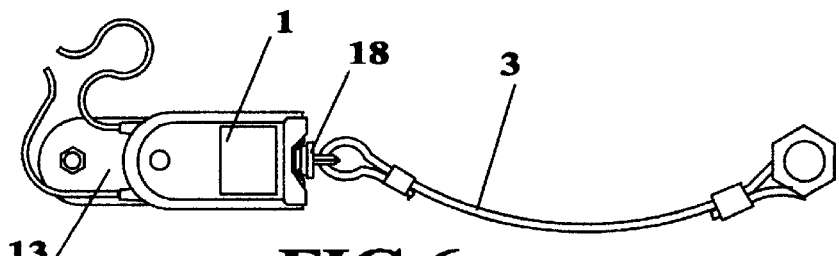
FIG. 6 illustrates a breakaway type switch and cable in the monitoring position.
Figure 7:
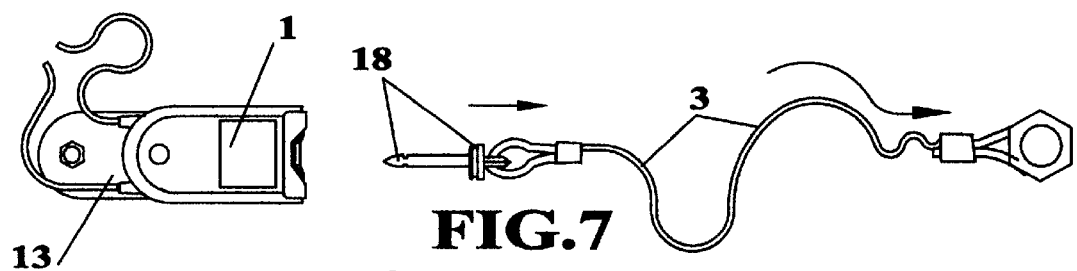
FIG. 7 illustrates a breakaway switch and cable in the activated position.
Figure 8:
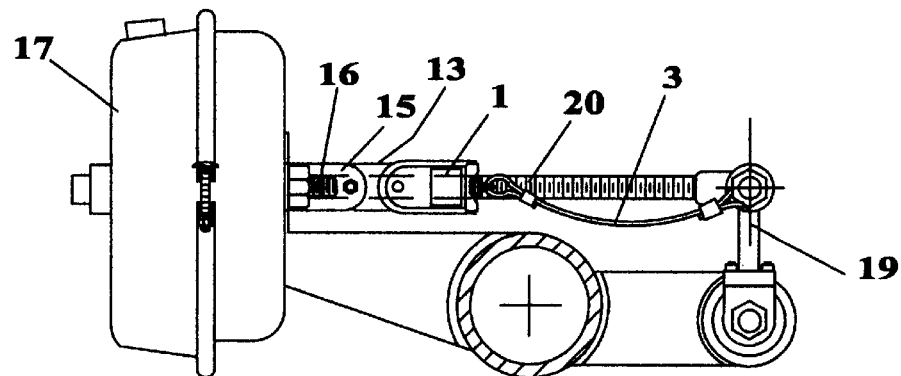
FIG. 8 illustrates the brake adjustment monitor device installed with an air brake system.
Figure 9:
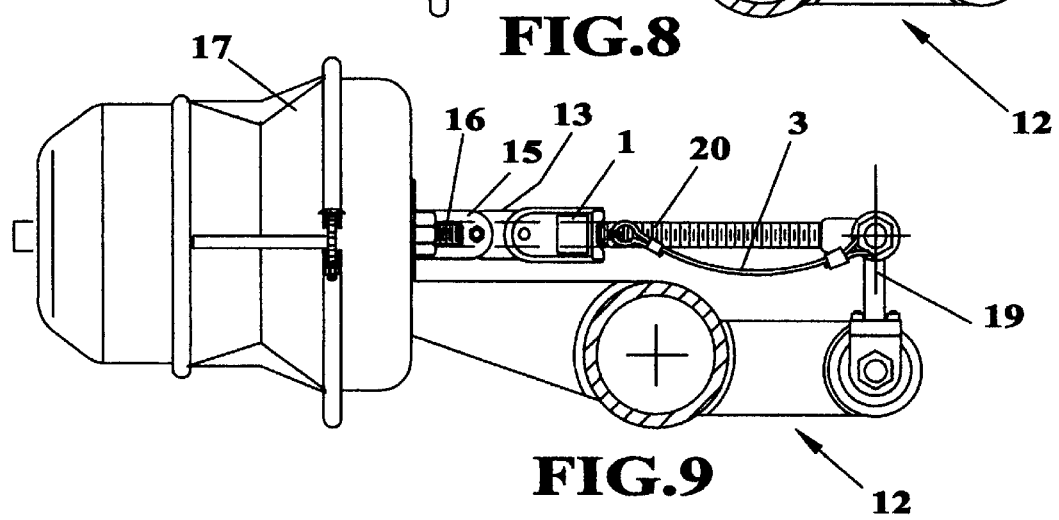
FIG. 9 illustrates the brake adjustment monitor device installed with a spring brake automatic air break out system as currently required on at least one axle of a vehicle.

In operation with the brakes not engaged the cable (3) may have a slack as illustrated in FIGS. 4, 6, 8 and 9. When the brakes are operated by the vehicle operator, the diaphragm in the air chamber assembly (17) urges the attached push rod (20) outwards which in turn moves the slack adjuster arm (19). This brake assembly operation causes the cable (3) to pull against the force of activation pin (18) which with sufficient movement will cause the cable (3) to become taut. If the travel of the push rod (20) reaches the predetermined distance of travel, the switch (1) is activated by the distance of movement of the activation pin (18) as illustrated in FIG. 5 or the release of the activation pin (18) as illustrated in FIG. 7. In the case of FIG. 7 a visual indication of wear is provided with the dangling cable (3) and activation pin (18). In either configuration the activation pin (18) movement causes the switch (3) to signal push rod (20) movement the predetermined distance to warn of needed brake service.

While in the preferred embodiment the cable (3) has been described as attached to an existing location on the slack adjustment arm (19) as the simplest installation, obviously the cable (3) may have means for attachment such as to the push rod (20) itself. So long as the cable (3) is drawn tout by the movement of the push rod (20) relative to the air chamber assembly (17) the brake monitoring switch (1) and cable (3) may be attached in the most convenient manner depending on the particular brake system.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A brake adjustment monitor device installation with an automotive vehicle air brake system comprising:
    a switch having output means for communication to an operator that the switch has been activated and the switch attachable to an air chamber assembly by a means for attachment;
    an activation pin operatively engaged with the switch and having a cable at one end attached thereto;
    the cable at an opposite end attachable to an assembly of a push rod and a slack adjustment arm of an air brake system by a cable means for attachment such that when movement of the push rod has reached a predetermined distance the cable will pull the activation pin a sufficient distance to activate the switch.

2. The device as in claim 1 wherein the means for communication is the activation pin pulled from the switch and hanging under the force of gravity at the end of the cable.

3. The device as in claim 1 wherein the means for communication is a plurality of electrical leads having at least one lead connected to a bulb and to a power supply and a second lead connected to an electrical ground.

4. The device as in claim 3 wherein the power supply is independent of the automotive vehicle power supply.

5. The device as in claim 3 wherein at least one of the bulbs is attachable to a front of a vehicle trailer for operator viewing by means of a rear view mirror.

6. The device as in claim 1 wherein the means for attachment to the air chamber assembly is an angle bracket attached to an existing attachment device and the switch having a bracket for attachment to the angle bracket.

7. The device as in claim 1 wherein the cable means for attachment is an existing attachment device of the slack adjustment arm.

* * * * *